(12) United States Patent
Maciolek et al.

(10) Patent No.: US 12,445,999 B1
(45) Date of Patent: Oct. 14, 2025

(54) TWO WAY PAGER SYSTEM

(71) Applicant: UIPCO, LLC, San Antonio, TX (US)

(72) Inventors: Michael J. Maciolek, Kerrville, TX (US); Manfred Amann, San Antonio, TX (US); Donnette L. Moncrief Brown, San Antonio, TX (US); Timothy Frank Davison, San Antonio, TX (US); Snehal Desai, Richardson, TX (US); Nicole Ferretti, Dallas, TX (US); Rachel Michelle Ballew, San Antonio, TX (US); Kelsey Anne O'Brien, Austin, TX (US); Sayeef Rahim, Allen, TX (US); Eric David Schroeder, San Antonio, TX (US); Steven J. Schroeder, Oak Point, TX (US); Joseph Michael Vesco, Sparks, NV (US); Justin Dax Haslam, San Antonio, TX (US); Melissa Jane Porter, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 445 days.

(21) Appl. No.: 18/161,513

(22) Filed: Jan. 30, 2023

Related U.S. Application Data

(60) Provisional application No. 63/267,356, filed on Jan. 31, 2022.

(51) Int. Cl.
*H04W 68/00* (2009.01)

(52) U.S. Cl.
CPC .................. *H04W 68/005* (2013.01)

(58) Field of Classification Search
CPC ... H04W 68/00; H04W 68/005; H04W 68/02; H04W 68/04; H04W 72/00; H04W 72/12; H04W 72/121
See application file for complete search history.

(56) References Cited

U.S. PATENT DOCUMENTS

| 9,456,322 | B1* | 9/2016 | Charugundla | .......... H04W 4/14 |
| 2016/0035196 | A1* | 2/2016 | Chan | .................... H04W 68/005 340/541 |

* cited by examiner

*Primary Examiner* — Siu M Lee
(74) *Attorney, Agent, or Firm* — Plumsea Law Group, LLC

(57) ABSTRACT

A system and method provide a two-way pager system. Members use pager systems to communicate in situations where they lack power or access to other modes of communication. For example, the pagers have a switching system that allows users to broadcast information about their current situation in an emergency. For example, the system could use switches that could be set to three different settings. Separate switches could be used for different categories of resources required in an emergency, and the switches could take on settings that represent resource requirements and availability. A centralized system listens for pages from users' pagers that transmit the switch settings for the categories. The centralized system then determines which users lack certain resources, which users have sufficient resources, and which users need certain resources. The system then transmits information through the pager network to inform users where to find resources that they are lacking.

20 Claims, 16 Drawing Sheets

RESOURCE TABLE

| PAGER | FOOD | WATER | SHELTER | POWER | LOCATION |
|---|---|---|---|---|---|
| PAGER 1 | EXTRA | HAVE | NEED | NEED | A |
| PAGER 2 | HAVE | NEED | NEED | HAVE | B |
| PAGER 3 | NEED | HAVE | EXTRA | HAVE | C |
| PAGER 4 | NEED | EXTRA | EXTRA | EXTRA | D |

FIG. 9

TWO WAY PAGER SYSTEM

CROSS-REFERENCE TO RELATED APPLICATIONS

This application claims the benefit of U.S. Provisional Patent Application Ser. No. 63/267,356 filed on Jan. 31, 2022 and titled "Two Way Pager System." The disclosure of which is incorporated by reference in its entirety.

TECHNICAL FIELD

The present disclosure generally relates to a modified two-way pager system. The present disclosure more specifically relates to a method and system for using pagers to manage needed resources during or after an emergency.

BACKGROUND

During or after an emergency, users in an area may need access to certain resources. The only type of communication available may be a pager network. Accordingly, it may be desirable to provide the ability to send signals from pagers of the users in the area to a central server, such that the central server can match the pagers of users who need certain resources with locations of pagers of users who have those resources. The central server can then send this information to the pagers for use by the users who need the resources.

However, at present, pager networks are only adapted to send numeric or alphanumeric sequences from a dialing party to a dialed party in a pager network. Pagers do not provide a way for users of individual pagers to effectively indicate which resources a user of a given pager may require or may be able to provide. Also, existing pager systems do not provide a way to aggregate resource availability information received from individual pagers, match resource providers to resource consumers, and send information about the locations of such resource providers to such resource consumers.

There is a need in the art for a system and method that addresses the shortcomings discussed above.

SUMMARY

In one aspect, a pager to provide access for a user of the pager to resources after an emergency includes switches on the pager set to represent availability of resources for a user of the pager. The pager further includes at least one processor. The at least one processor is configured to read the settings of the switches on the pager set to represent the availability of resources for the user of the pager. The at least one processor is further configured to convert the settings of the switches to a first coded numeric representation. The at least one processor is further configured to send the first coded numeric representation to a central server as a page. The at least one processor is further configured to receive a second coded numeric representation from the central server as a page. The at least one processor is further configured to decode the second coded numeric representation to identify at least one source of a resource to be used by the user of the pager. The at least one processor is further configured to provide information about at least one location of the at least one source of the resource to the user of the pager using a display of the pager.

In another aspect, a method to provide access for a user of a pager to resources after an emergency includes a step of generating a first coded numeric representation based on settings of switches on the pager set to represent availability of resources for a user of the pager, wherein each switch is a tri-state switch whose position indicates for a respective resource that the user has enough of the resource, excess of the resource, or lacks the resource. The method further includes a step of sending a page comprising the first coded numeric representation to a central server. The method further includes a step of receiving a second coded numeric representation from the central server as a page. The method further includes a step of decoding the second coded numeric representation to identify at least one source of a resource to be used by the user of the pager. The method further includes a step of storing information about the at least one source of the resource at the pager. The method further includes a step of determining a source of the resource from the information. The method further includes a step of providing location information about the source of the resource to the user of the pager using a display of the pager.

In another aspect, a method performed by a central server to provide access to resources for users of pagers in a pager network after an emergency includes a step of receiving a plurality of pages from pagers in a pager network. The method further includes a step of decoding the plurality of pages to determine which pagers require resources and which pagers have excess quantities of resources. The method further includes a step of determining, for each pager in the pager network, which resources each pager requires. The method further includes a step of determining, for each resource, at least one pager able to provide that resource. The method further includes gathering, for each resource required by each pager in the pager network, a set of pagers able to provide that resource. The method further includes generating a page representing resource availability and location information for the set of pagers as a coded numeric representation. The method further includes sending the page to the pagers in the pager network.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is a resource table showing which pagers correspond to users with certain resources and locations, according to an embodiment;

DETAILED DESCRIPTION

Figure 1:
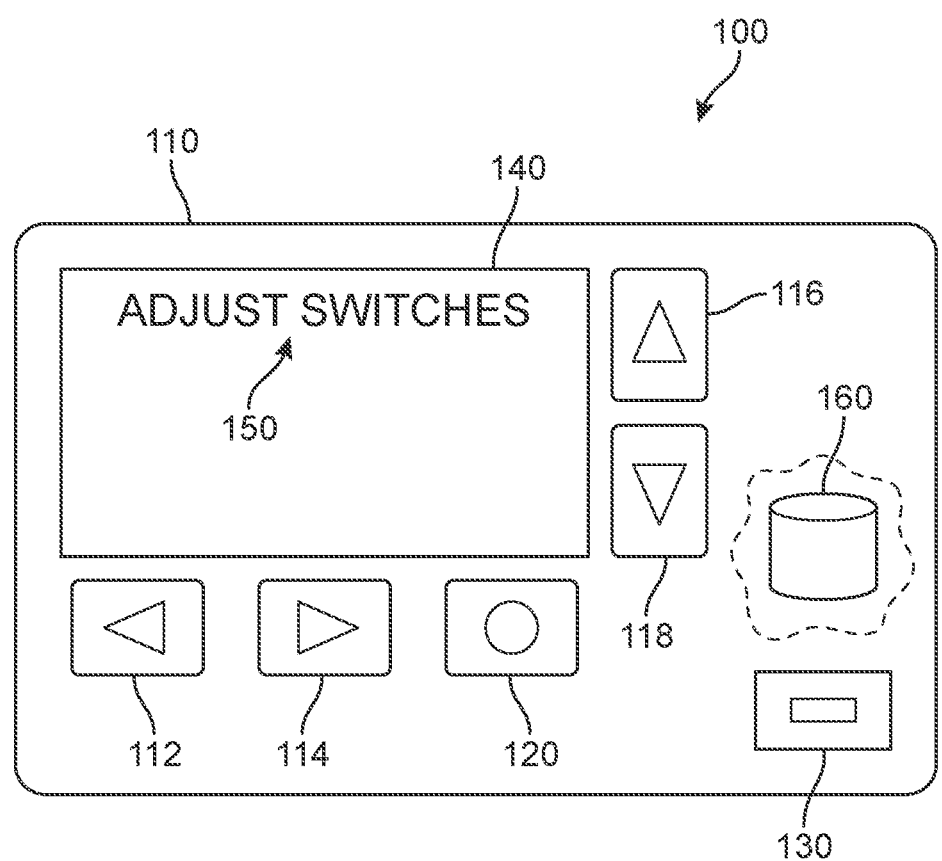
FIG. 1 shows a diagram of a pager prompting for resource availability information from a user, according to an embodiment.

In embodiments, users use pager systems to communicate when other communication systems are not available, such as during or after an emergency. Pagers are devices that send and receive numeric, alphanumeric, or voice messages over a pager network. A pager network may still work even if other networks do not, due to certain resilient properties of the pager network discussed further, below. Thus, in an emergency, modified pagers may broadcast information about what resources users have and/or lack. For example, a user may have sufficient food, may be able to share water, and may lack shelter and power. Controls on pagers, such as dual in-line package (DIP) switches, may indicate, for each resource, whether a given user needs, has, or is able to share a respective resource.

During an emergency, a central server listens to messages as a dialed party, the messages being pages received from user pagers as dialing parties. The central server determines which users have, need, or are able to share, various resources. The central server thus considers which users need a resource and informs users where to obtain the given resource. The central server obtains updated messages from pagers as resource availability changes. For example, users may have obtained a new supply of a resource. Alternatively, users may have exhausted a supply of a resource. These events affect that user's position with respect to the resource, and thus the user should update his or her status with the central server.

Thus, a pager system connects dialing parties with dialed parties. In the pager system, the central server aggregates the information about resource availability based on pages it receives from the individual pagers in the network. The central server then provides guidance about how to obtain the resources after or during the emergency. In embodiments, users use pagers to communicate in situation where an emergency prevents access to other modes of communication. For example, extreme weather may interfere with other forms of communication, but the pager network may still be operational. Pager networks are exceptionally resilient due to the way in which they operate. Pagers send messages with Very High Frequency (VHF) radio signals, typically broadcast in the range 138-466 MHZ (similar to normal FM radio programs). Using high-frequency radio means the signals reach further, need fewer transmitters, and suffer less from interfering obstacles than cellphone signals and the like, such as 4G and 5G.

Accordingly, users are much more likely to receive a pager message in a remote area or after or during an emergency or disaster than a cellphone call or text message, where signals may not operate properly. Additionally, pager messages are typically received very quickly. For example, wide-area pager messages are typically sent and received within thirty seconds, and local paging networks may send and receive messages within five seconds. By contrast, short message service (SMS) messages can take minutes, hours, or even longer if there is network congestion. Cell networks are also prone to disruption. Pagers are also less likely to interfere with other electronic equipment, and may be simpler to use than cellphones, feature phones, or smartphones. Pagers also have a long battery life, due to their modest power requirements.

Pagers operate as part of a paging system that includes one or more fixed transmitters (or in the case of response pagers and two-way pagers, one or more base stations), as well as a number of pagers carried by mobile users. These systems can range from a restaurant system with a single low-power transmitter, to a nationwide system with thousands of high-power base stations. While pagers have been replaced to some degree by cellphones and smartphones, pagers continue to be used by some emergency services and public safety personnel, because modern pager systems' coverage overlap, combined with the use of satellite communications, can make paging systems more reliable than terrestrial-based cellular networks in some cases, including during and after natural and man-made disasters and emergencies. This resilience has led public safety agencies to adopt pagers over cellular and other commercial services for critical messaging.

FIG. 1 shows a diagram 100 of a pager 110 prompting for resource availability information from a user 210, according to an embodiment. A pager, also known as a beeper, bleeper, or pocket bell, is a wireless telecommunications device that receives and displays alphanumeric or voice messages. One-way pagers can only receive messages, while response pagers and two-way pagers can also acknowledge, reply to, and originate messages using an internal transmitter.

The following disclosure focuses on pagers that use alphanumeric messages, though it will be recognized that approaches could be adapted to voice message with appropriate voice recognition and text-to-speech synthesis software. The following disclosure also focuses on pagers that are response pagers or two-way pagers, in that the users of the pagers need to be able to receive information for determining where to obtain resources the users of the pagers require and also send information about their own resource availability. However, it will be recognized that while a pager must be a two-way pager to send information about its resource status, one-way pagers could receive pages from the central server and decode them to share information about resource availability.

FIG. 1 shows an example pager 110. Pager 110 includes several control buttons 112, 114, 116, 118, 120 and 130. For example, control buttons 112 and 114 and control buttons 116 and 118 are arrow buttons that a user 210 can use to navigate between messages and control options for the pager 110. Control buttons 120 and 130 may be buttons that select an option or otherwise enter a command for pager 110. However, control buttons 112, 114, 116, 118, 120 and 130 are only examples, and other types of control buttons may be a part of pager 110 in addition to or instead of these enumerated control buttons. Pager 110 also includes a screen 140. Screen 140 is shown as a screen 140 that is able to display alphanumeric data, but screen 140 may be limited to displaying numeric data or may be able to display bitmapped graphics as well.

For example, in FIG. 1, screen 140 displays the message 150 "ADJUST SWITCHES." Here, the message 150 indicates that the user 210 is to adjust switches to indicate resource availability for a user 210. FIG. 1 also includes a local storage 160. Such a local storage 160 may be a small repository of persistent memory used in the functioning of the pager 110. In particular, the local storage 160 may store a look-up table, as discussed below. Such a look-up table may associate codes for locations received by the pager 110, as discussed further below, with street addresses or coordinates. Such a look-up table allows the pager 110 to direct a user 210 where to obtain needed resources.

Figure 2:
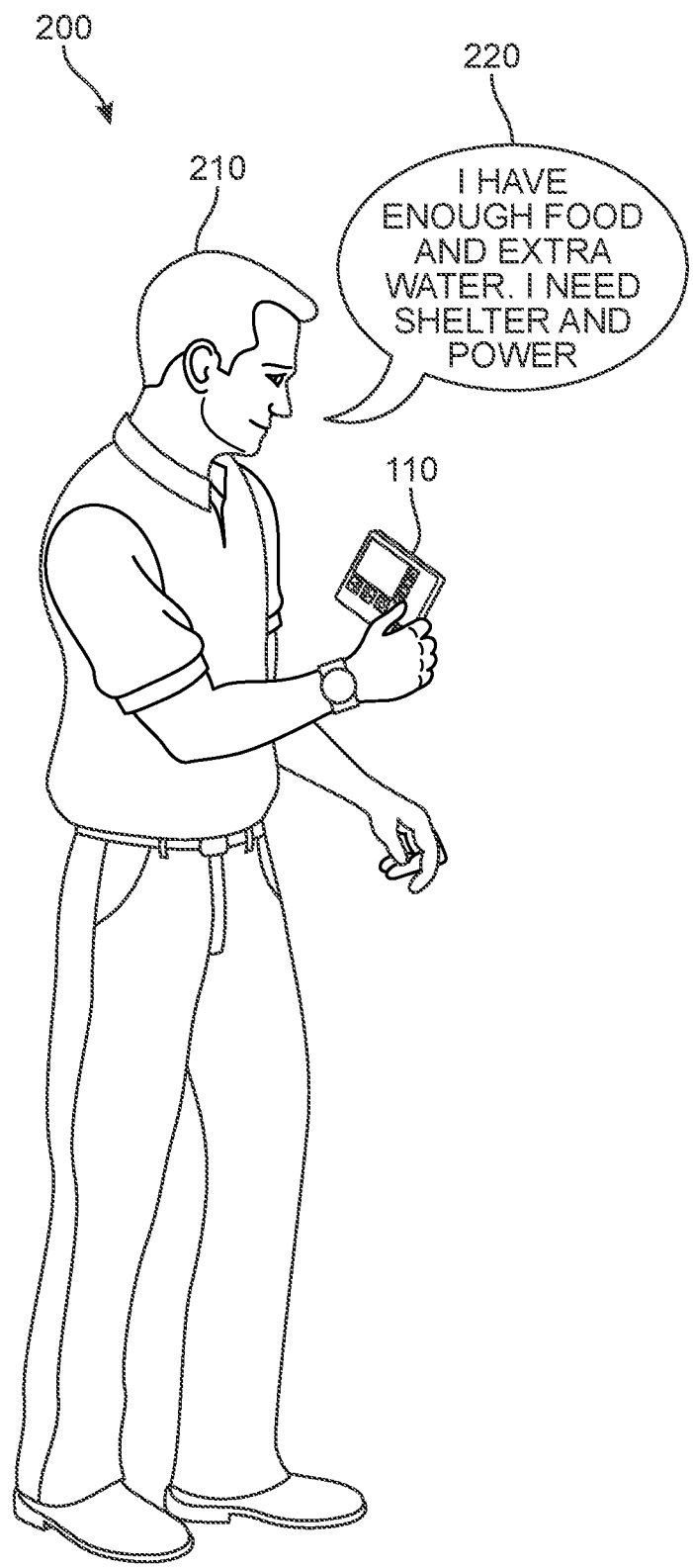
FIG. 2 shows a diagram of a user explaining what resources the user needs in an emergency, according to an embodiment.
Figure 3:
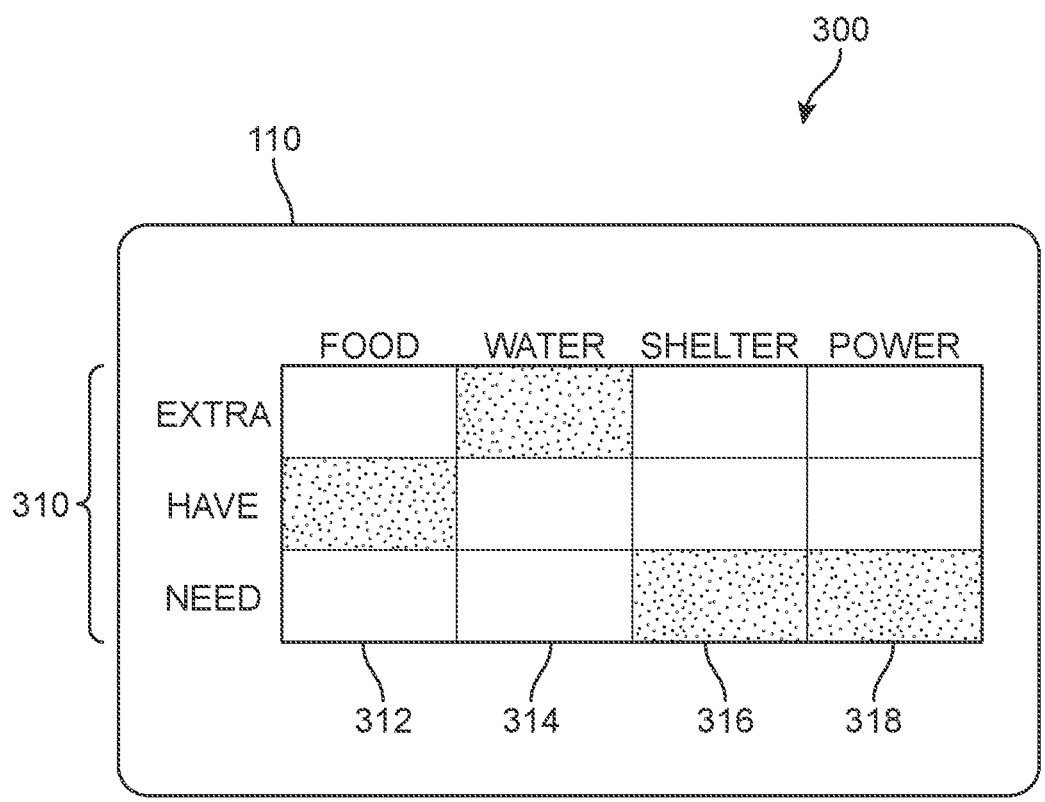
FIG. 3 shows a diagram of dual in-line package (DIP) switches, according to an embodiment.

FIG. 2 shows a diagram 200 of a user 210 explaining what resources the user 210 needs in an emergency, according to an embodiment. For example, user 210 may hold a pager 110. The user 210 may articulate a need 220, such that the user 210 indicates "I have enough food and extra water, I need shelter and power." The user 210 can enter these needs as a physical representation using DIP switches as shown in FIG. 3, as an example. In general, during an emergency a user 210 may have enough of a resource, may have extra of a resource, or may need a resource. In particular, individual users are likely to need a resource, and suppliers (such as stores and gas stations) may be able to provide a resource. A resource's availability does not necessarily mean that the resource is free. For example, a supermarket may have food available, but the user 210 may need a supply of money to purchase that food.

FIG. 3 shows a diagram of dual in-line package (DIP) switches, according to an embodiment. In FIG. 3 a pager 110 includes a bank of dual in-line package (DIP) switches. A DIP switch is a manual electric switch that is packaged with others in a group in a standard dual in-line package (DIP). The term may refer to each individual switch, or to the unit as a whole. This type of switch is designed to be used on a printed circuit board along with other electronic components and is commonly used to customize the behavior of an electronic device for specific situations. Thus, in some embodiments, DIP switches are switched to indicate, for a pager, what resource availability is to be associated with that pager.

In other embodiments, other mechanical means and indicators may allow a user to indicate resource availability. Such mechanical means may include other varieties of switches, buttons, dials, sliders, and other instrumentation associated with a pager that allows a user to change a value associated with availability of a resource. Any mechanical means that is able to take on at least two (and preferably three) discrete values may be used in this context to indicate resource availability. An advantageous property of using such mechanical means is that they are simple and convenient to operate. Mechanical indicators may be set without requiring an external power supply or a complicated interface. Generally, mechanical indicators may be allocated such that the status of each resource is represented by one indicator, or by two or more indicators in combination.

However, DIP switches are well-adapted for use in a mechanical representation of resource availability, and hence FIG. 3 shows the use of DIP switches to indicate resource availability. For example, FIG. 3 shows a pager 110 with a bank of DIP switches 310, where each DIP switch is set by the user 210. The DIP switches 310 shown in FIG. 3 are each able to assume one of three states, namely extra, have, and need. For example, there are four DIP switches provided in FIG. 3, specifically food 312, water 314, shelter 316, and power 318.

In various embodiments, various types of DIP switches 310 may be used. For example, FIG. 3 shows that the DIP switches 310 are tri-state type DIP switches 310. However, other types of DIP switches 310 may be used in pager 110, with appropriate modifications. For example, the DIP switches 310 may be slide-style, rocker-style, rotary-style, plano-style, and so on. However, other than tri-state type DIP switches, rotary-style DIP switches are well-adapted for use in examples because one DIP switch can indicate three states (Extra, Have, Need).

However, in other examples, DIP switches may indicate resource availability in different ways. For example, each resource could be represented by two two-state DIP switches, where the first DIP switch indicates whether the user 210 needs the resource or not, and the second DIP switch indicates whether the user 210 can share the resource if the user 210 has the resource. Additionally, because a rotary DIP switch can have more than three settings, a rotary DIP switch could indicate differing degrees of need or differing degrees of ability to provide a resource.

Figure 4:
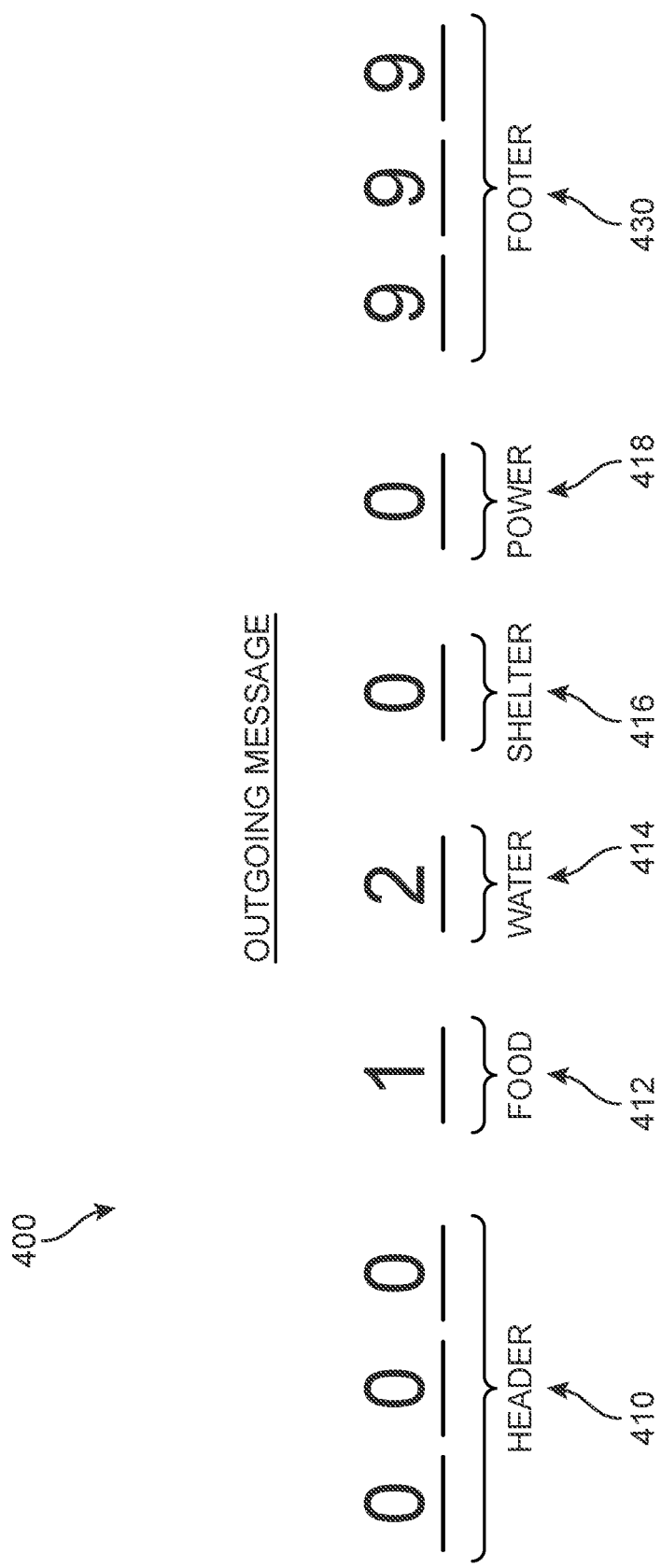
FIG. 4 shows a diagram of an outgoing pager message, according to an embodiment.

FIG. 4 shows a diagram of an outgoing pager message 400, according to an embodiment. The outgoing pager message 400 is presented here as a numeric string that can be sent through the pager network. However, in other embodiments, the outgoing pager message 400 may include other string formats, such as but not limited to, alphanumeric strings, strings in ASCII or Unicode, hexadecimal strings, octal strings, or binary strings.

For example, the outgoing pager message 400 as shown in FIG. 4 includes a header 410, a digit representing access to food 412, a digit representing access to food 414, a digit representing access to food 416, a digit representing access to food 418, and a footer 430. For example, the outgoing pager message 400 takes on the form of a digit string "0001200999." The digit string includes several constituent portions.

The digit string begins with a header 410 "000." The digit string "000" may be a reserved set of digits that signals to a central server that the following page attests to resource information for the pager that sends the page. The header 410 is followed by payload digits. For example, the outgoing pager message 400 includes four payload digits for food 412, water 414, shelter 416, and power 418. The payload digits correspond to the settings of the DIP switches 310 as shown in FIG. 3. For example, the food payload digit 412 is 1, indicating that the user 210 has enough food, but does not have excess food to share with other users. Similarly, the water payload digit 414 is 2, indicating that the user 210 has enough water, and also has excess food to share with other users. The shelter payload digit 416 and the power payload digit 418 are each 0, indicating that user 210 does not have enough of these resources, and requires more. However, the nature of these resources differs. In general, a user 210 either has shelter or does not have shelter. However, power is of varying quantities, and a user 210 may have access to some electrical power, but may require additional power to support his or her power needs. After the relevant payload digits, the outgoing pager message 400 concludes with a footer 430, which here is shown as a digit string "999."

The outgoing message 400 presented in FIG. 4 is only an example. Other embodiments may use other formats for the outgoing message 400. For example, other headers and footers may be used in other examples. Also, the outgoing message 400 may include additional digits that provide additional information. The content of the outgoing message 400 is also to be accompanied by a registration system or pager ID. Such information need not be a part of the outgoing message 400. Still, the recipient of the page will be able to know the identity of the pager that sends the message as a part of receiving the page. For example, a manufacturer could preprogram a pager with an ID when manufactured in a way that pages it sends carry not only content, but an identity of the pager. The pager may also send location information along with the page, as discussed further below. For example, the pager system may associate locations with specific pagers, such as by allowing a look-up table to determine a location associated with a particular pager ID or a corresponding code.

Figure 5:
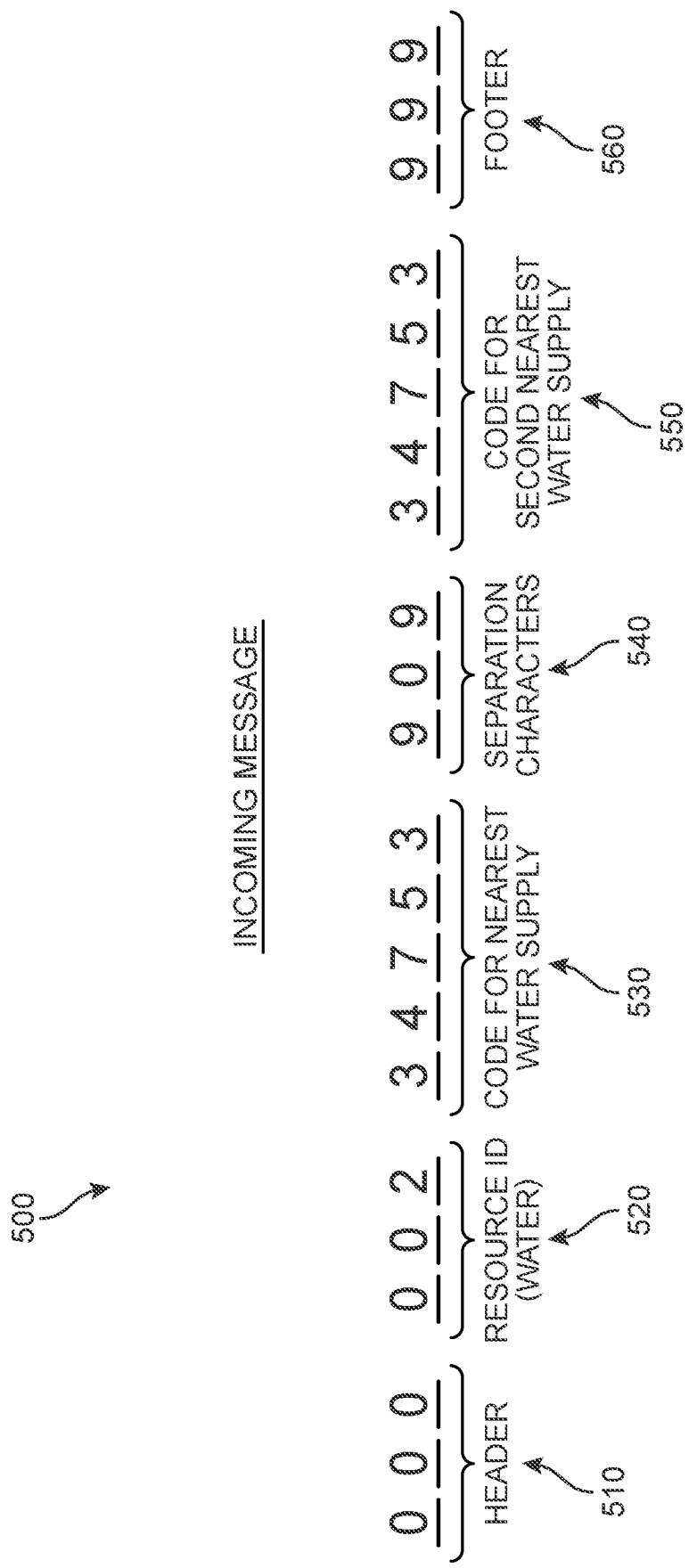
FIG. 5 shows a diagram of an incoming pager message, according to an embodiment.

FIG. 5 shows a diagram of an incoming pager message 500, according to an embodiment. Such an incoming pager message 500 is a message that the pager receives with information about how to access information the pager needs. For example, the incoming pager message 500 may be "0000023475390945362999." The incoming pager message 500 begins with a header 510 "000," followed by a resource ID 520 "002," indicating that the current incoming pager message 500 pertains to sources of water. Thus, each resource may be designated by a resource ID 520. For example, resource ID 520 "001" may pertain to food, resource ID 520 "002" may pertain to water, resource ID 520 "003" may pertain to shelter, and resource ID 520 "004" may pertain to power.

Following the header 510 and the resource IDS 520 is information about one or more nearest sources of the resource in question, which in FIG. 5 is water. For example, the incoming pager message 500 includes a first code 530 "34753" for a nearest water supply, followed by a set of separation characters 540 "909," followed by a code 550 "45362" for a second nearest water supply. Finally, the incoming pager message 500 ends with a footer 560 "999." As with the outgoing pager message 400, the incoming pager message 500 as shown in FIG. 5 is only an example and other formats for presenting this information are possible.

Figure 6:
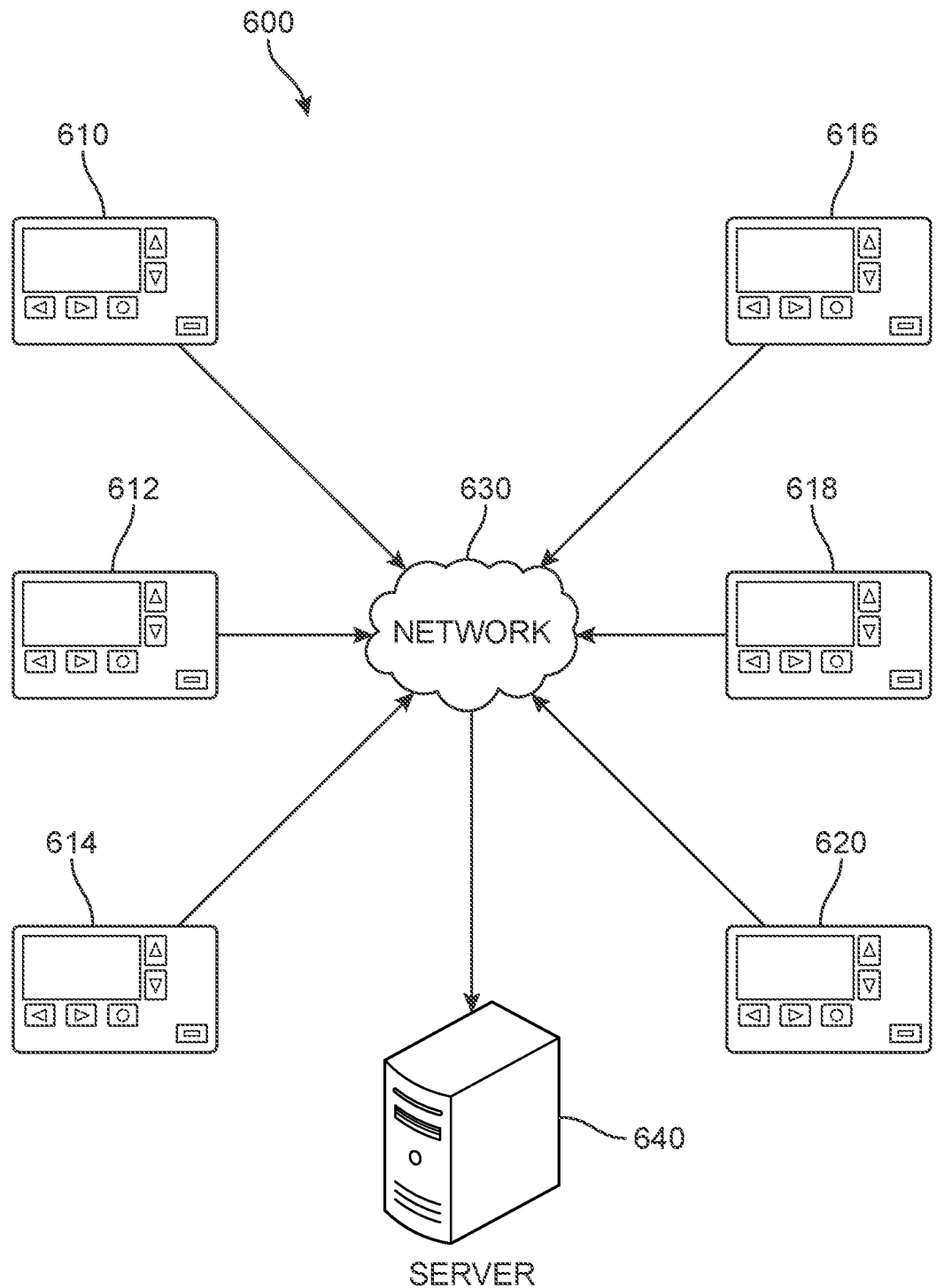
FIG. 6 shows a diagram of pagers in a network sending pages to a central server, according to an embodiment.

FIG. 6 shows a diagram 600 of pagers in a network sending pages to a central server 630, according to an embodiment. For example, there may be pagers 610, 612, 614, 616, 618, and 620 in a region, all of which transmit pages to a network 630. Network 630 relays the messages to a server 640. The server 640, as described below, consolidates the information provided in these messages to establish which pagers are able to provide resources.

Figure 7:
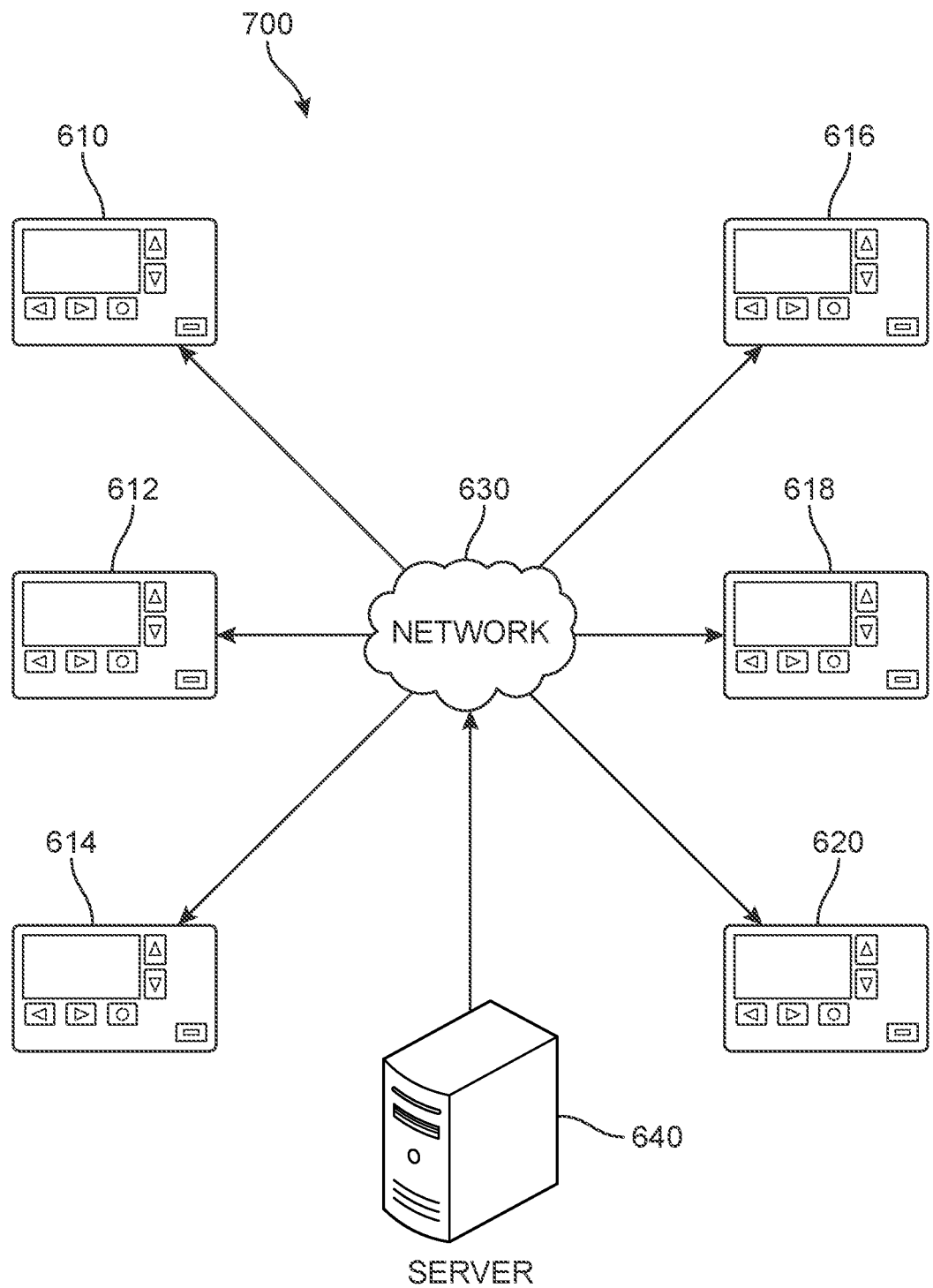
FIG. 7 shows a diagram of pagers in a network receiving pages from a central server, according to an embodiment.

FIG. 7 shows a diagram 700 of pagers in a network receiving pages from a central server, according to an embodiment. FIG. 7 provides the inverse of FIG. 6. For example, FIG. 7 again illustrates pagers 610, 612, 614, 616, 618, and 620. The pagers are connected to server 640 through network 630. However, in FIG. 7, instead of the pagers 610, 612, 614, 616, 618, and 620 sending messages, the pagers receive messages. The messages are produced by the server 640 and distributed to the pagers 610, 612, 614, 616, 618, and 620 through the pager network 630.

Figure 8:
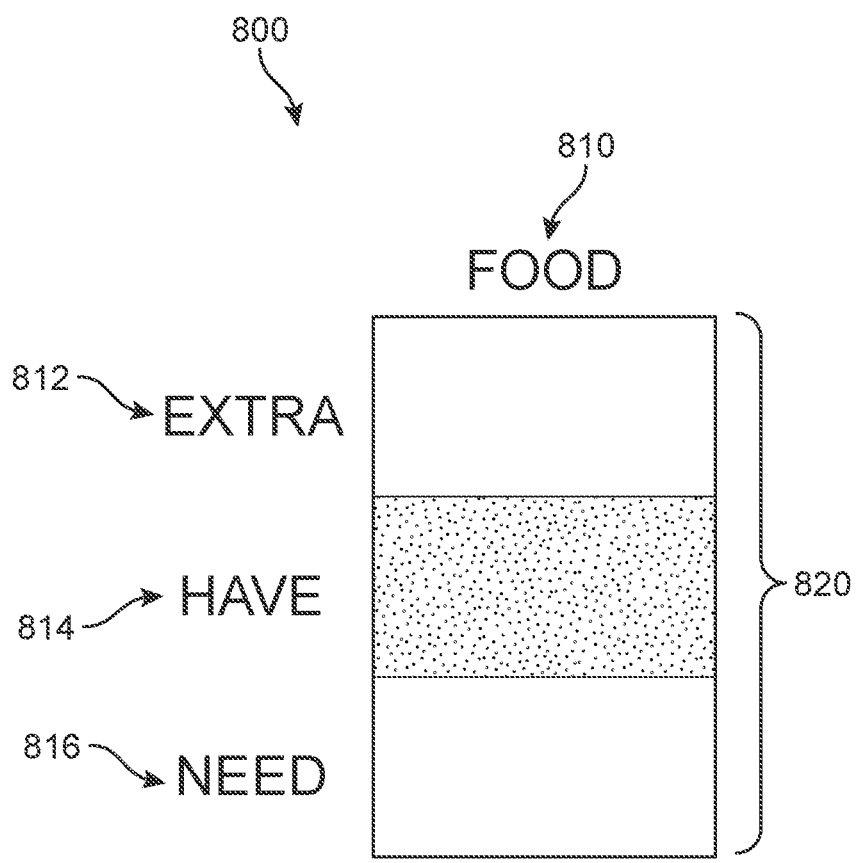
FIG. 8 shows a diagram of a tri-state dual in-line package (DIP) switch, according to an embodiment.

FIG. 8 shows a diagram 800 of a tri-state dual in-line package (DIP) switch, according to an embodiment. For example, tri-state DIP switch 810 shows a tri-state switch 820 that is able to be set for extra 812, have 814, and need 816 settings. These settings correspond to availability of a resource. For example, in FIG. 8, tri-state DIP switch 810 represents availability of food 810. In the example of FIG. 8, the tri-state DIP switch 810 is set to have the state switch set for have 814, indicating that the user 210 has enough food (at least for his or her current needs) but does not have food to share. A user 210 may adjust a DIP switch as his or her resource needs and supply change.

It is to be noted that generally, individual users will not necessarily set a switch for extra 812, even if they could potentially share a resource. Users may not wish to share resources with random strangers who need the resources. By contrast, stores and retail establishments, as well as other locations that are likely to be intended to stockpile and provide resources, have as part of their mission to provide resources. Other examples of resource sources include non-profits, religious institutions, and government offices. For example, a grocery store may provide food and water, while a gas station provides food, water and fuel.

However, simply being able to provide resources does not guarantee that the resources are free of charge. For example, a grocery store may provide food and water, but at a charge. A user 210 may choose to identify providers of a resource after an emergency that provides resources specifically for free. For example, a soup kitchen may provide food without charge. A homeless shelter or emergency government shelter may provide shelter without charge. It may be helpful to establish how to obtain a resource without charge because users may have limited access to funds after an emergency occurs.

FIG. 9 is a resource table 900 showing which pagers correspond to users with certain resources and locations, according to an embodiment. Resource table 900 includes a column 910 with pager numbers, which are also known as pager IDs. For example, there is a row for Pager 1 930, a row for Pager 2 932, a row for Pager 3 934, and a row for Pager 4 936. There is a column 912 for food availability, a column 914 for water availability, a column 916 for shelter availability, a column 918 for power availability, and a column 920 for location information.

Thus, the resource table 900 shows which pagers are associated with excess resources, sufficient resources, and a need for resources, along with type information. While the resource table 900 shows that the resources under consideration are food, water, shelter, and power, other resources may be considered in addition to or instead of these example resources. Examples may include fuel and/or medicine of various types, as non-limiting examples. Additionally, more specific aspects of resources may be managed. Thus, embodiments track food availability with respect to specific types of food (grain, prepared meals, canned food, etc.) rather than simply managing food without further distinction.

Figure 10:
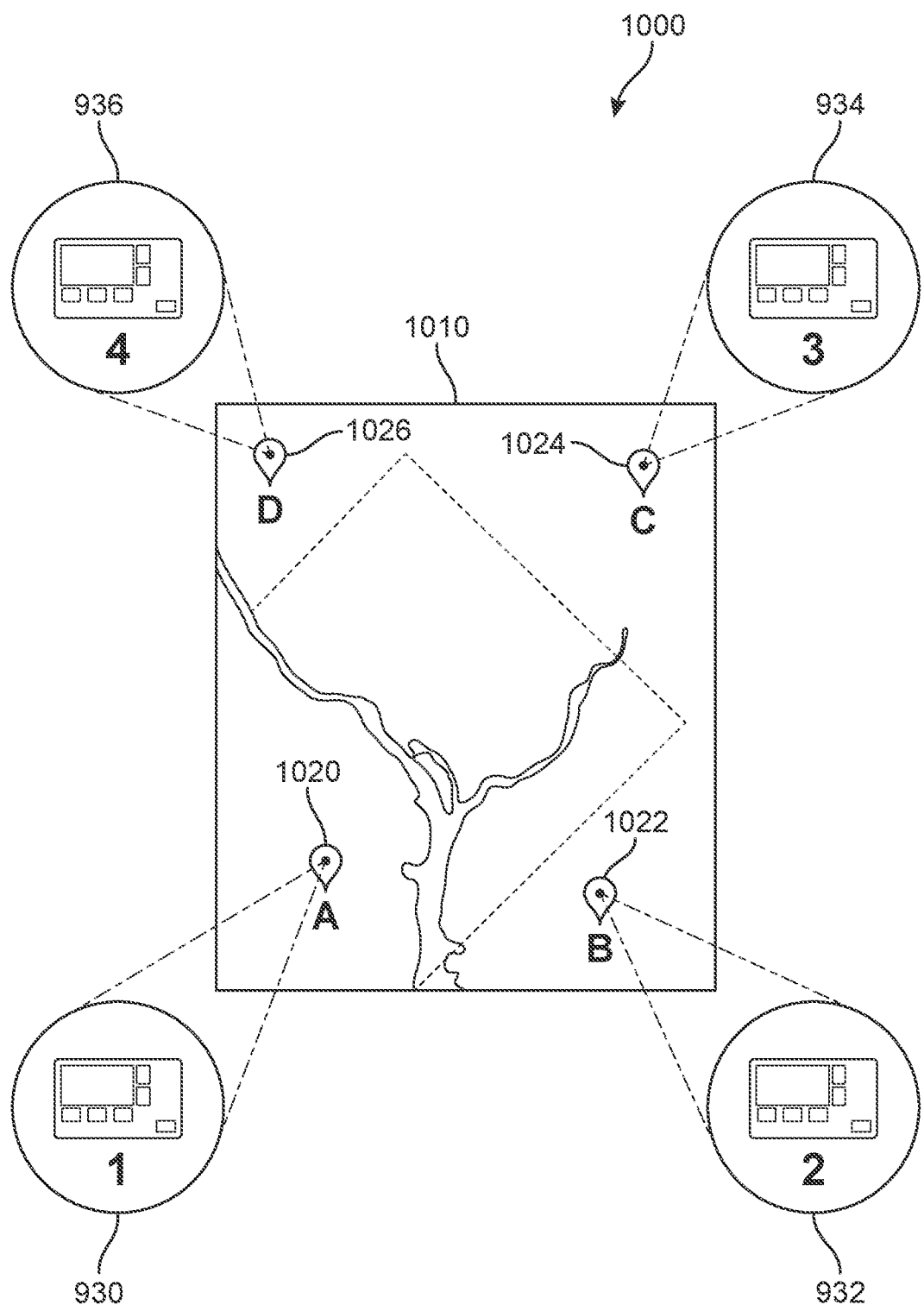
FIG. 10 shows a diagram of pagers in various locations in a geographic region, according to an embodiment.

Furthermore, the resource table 900 shows a column 920 for location information. In FIG. 9, each pager from column 910 corresponds to a location identifier specified by a letter corresponding to a location on a map, such as shown in FIG. 10. For example, the location of Pager 1 930 is designated as location identifier A, the location of Pager 2 932 is designated as location identifier B, the location of Pager 3

934 is designated as location identifier C, and the location of Pager 4 936 is designated as location identifier D.

For example, FIG. 10 presents a number of pictures of pagers and corresponding pinpoints on a map that show where the pagers are located. The identifiers specify locations in an area with a pager network deployed therein. However, the location information 920 in the resource table 900 may differ from merely providing a location identifier of the pager. For example, location information 920 may also store coordinates of the pager's location such as latitude/longitude information or a street address corresponding to the pager. In general, a pager is associated with a corresponding address associated with a building or other location at which the pager resides on an ongoing basis.

FIG. 10 shows a diagram 1000 of pagers in various locations in a geographic region, according to an embodiment.

FIG. 10 shows four pagers located within parts of a region depicted as map 1010. While four pagers are shown as a simplified example in FIG. 10, embodiments may include fewer pagers or more pagers, such as a network including dozens or even hundreds or more pagers. For example, these pagers include Pager 1 930 located at location A 1020 on map 1010, Pager 2 932 located at location B 1022 on map 1010, Pager 3 934 located at location C 1024 on map 1010, and Pager 4 936 located at location D 1026 on map 1010. Each of the locations defines a point or area within which the pager can be found. For example, each location may define a particular location (specified using coordinates such as latitude/longitude or a street address). A location may also be an area having a radius surrounding a particular location (specified by coordinates), such as a circular footprint with a three-meter radius of the location. However, this is merely an illustrative radius and shape, and other embodiments use different types and sizes of footprints. For example, a location may also identify a plot of land of various shapes or a lot for a building corresponding to a pager's location.

Figure 11:
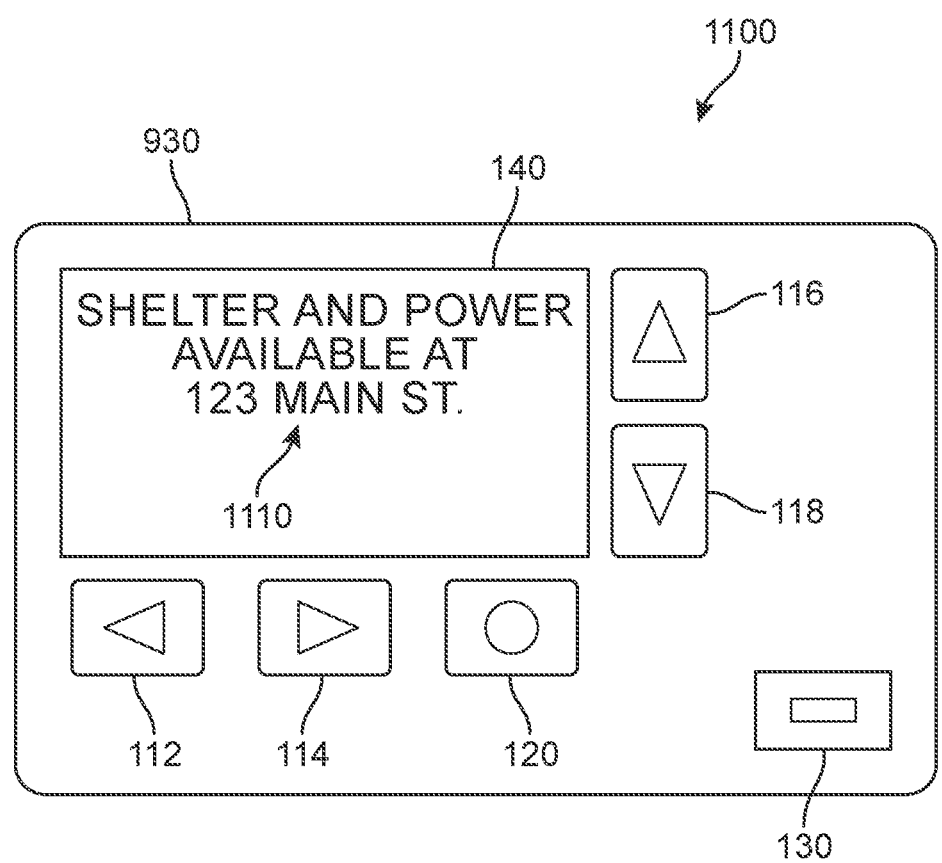
FIG. 11 shows a pager that provides information about where to find needed resources in an emergency, according to an embodiment.

FIG. 11 shows a pager 930 that provides information about where to find needed resources in an emergency 1100, according to an embodiment. The pager 930 of FIG. 11 corresponds to Pager 1 930 of FIGS. 9-10. For example, pager 930 includes several control buttons 112, 114, 116, 118, 120 and 130. For example, control buttons 112 and 114 and control buttons 116 and 118 are arrow buttons that a user 210 can use to navigate between messages and control options for the pager 930. Control buttons 120 and 130 may be buttons that select an option or otherwise enter a command for pager 930. However, control buttons 112, 114, 116, 118, 120 and 130 are only examples, and other types of control buttons may be a part of pager 930 in addition to or instead of these enumerated control buttons.

Pager 930 also includes a screen 140. Screen 140 is shown as a screen 140 that is able to display alphanumeric data, but screen 140 may be limited to displaying numeric data or may be able to display bitmapped graphics as well. For example, in FIG. 11, screen 140 displays the message 1110 "SHELTER AND POWER AVAILABLE AT 123 MAIN ST . . . " Here, the message 1110 indicates that the user 210 is able to obtain shelter and power at 123 MAIN ST. Here, 123 MAIN ST. may be a street address corresponding to location D. As shown in the resource table 900 of FIG. 9, Pager 1 930 requires shelter and power, and Pager 4 936 is able to provide these resources at location D. For example, Pager 4 936 may be associated with a government-operated emergency shelter at a particular address, which is here 123 MAIN ST. In an alternative embodiment, the message 1110 may present the source of shelter using a different format, such as by providing coordinates or navigation directions to the source of shelter and power. If multiple resources are required, separate sources may be displayed (possibly each as a separate message 1110). For example, the message 1110 include the street address that corresponds to the location(s) of the needed resources by causing pager 930 to consult a look-up table.

Moreover, the pager 930 may begin by presenting a source of a resource, such as shelter, that is most physically proximate to the user 210 of the pager 930. The pager 930 may allow the user 210 to scroll through sources of shelter using buttons such as buttons 112 and 114 or buttons 116 and 118. The user 210 of pager 930 then uses a button such as button 120 or 130 to select the resource provider and request additional information. For example, if the user 210 needs food, the user 210 may select a source of food using button 120 or 130, and can then receive additional information such as an identity and address of a food provider, as well as directions to the food provider and additional information about the kinds and prices of food that are available.

Figure 12:
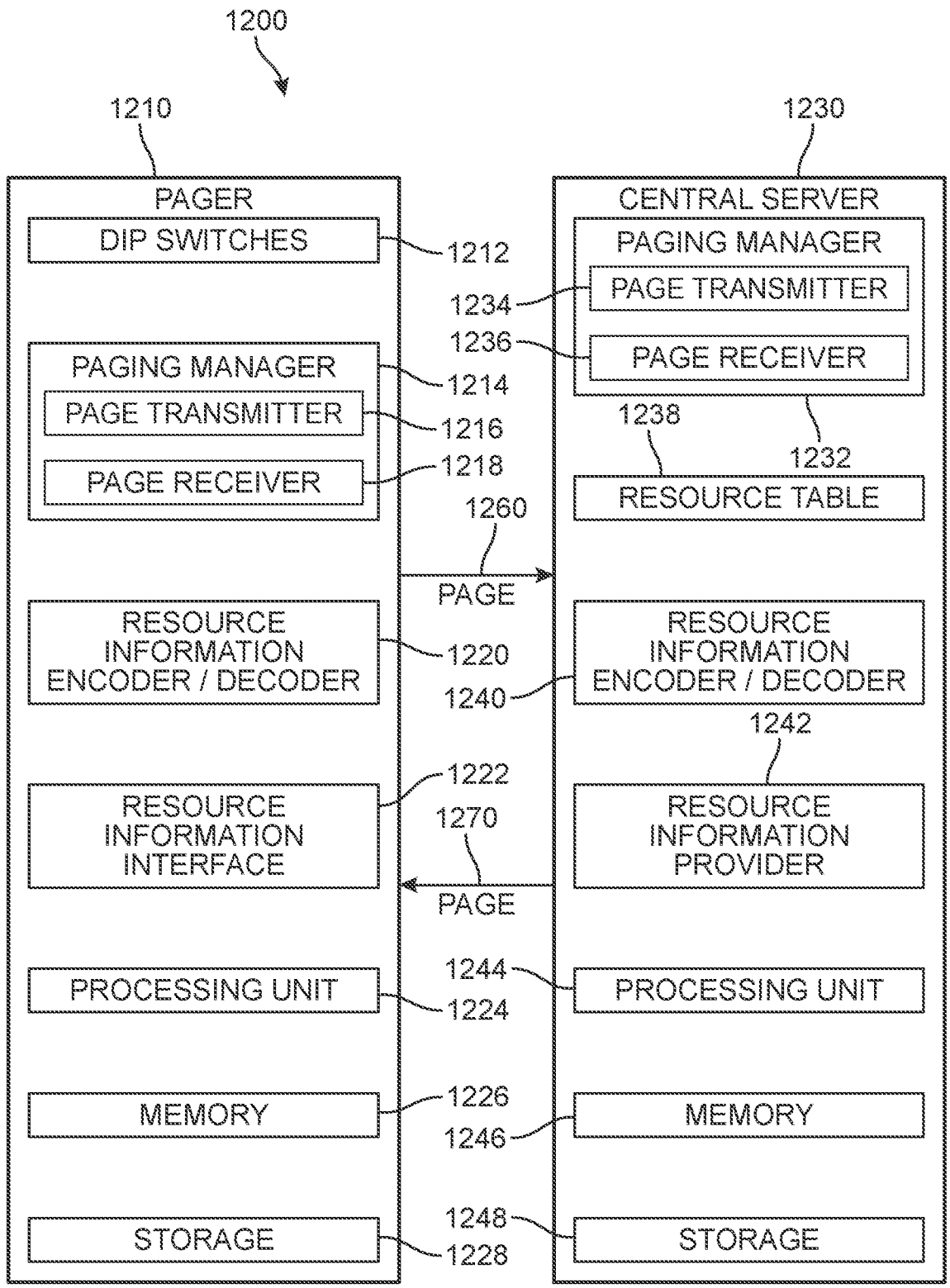
FIG. 12 is a structural diagram of a pager and a central server that interact with each other, according to an embodiment.

FIG. 12 is a structural diagram 1200 of a pager 1210 and a central server 1230 that interact with each other, according to an embodiment. The pager 1210 includes dual in-line package (DIP) switches 1212 and a paging manager 1214. The DIP switches 1212, as discussed above, may correspond to the examples of FIG. 3 and FIG. 8. The DIP switches 1212 may, for example, each indicate availability of a specific resource. The paging manager 1214 includes a page transmitter 1216 and a page receiver 1218.

The paging manager uses the page transmitter 1216 to send pages over the pager network as a dialing party and uses the page receiver 1218 to receive pages over the pager network as a dialed party. The sent pages include information based on the DIP switches for use by the central server 1230 and the received pages include information about based on resource availability received by the page receiver 1218 from the central server. For example, pager 1210 sends at least one page 1260 to central server 1230 (as a dialing party), and pager 1210 receives at least one page 1270 from central server 1230 (as a dialed party).

The pager 1210 also includes a resource information encoder/decoder 1220 and a resource information interface 1222. The resource information encoder/decoder 1220 encodes strings, such as numeric strings, to be sent as outgoing pages based on the settings of the DIP switches 1212. The information encoder/decoder 1220 also decodes strings, such as numeric strings, received from the central server 1230 based on resource availability. Examples of the strings to encode and decode are provided in FIGS. 4-5.

The resource information interface 1222 provides the pager 1210 with a way to present information to the user. The resource information interface 1222 may correspond to screen 140 of pager 110. For example, pager 1210 may use the resource information interface 1222 to display a message prompting the user 210 to set the DIP switches. The resources information interface 1222 may also display messages about where to obtain required resources. While resources information interface 1222 will generally include a screen 140 of pager 110 and control buttons such as control buttons 112, 114, 116, 118, 120 and 130, other interface elements are possible in other embodiments.

The pager 1210 also includes a processing unit 1224, a memory 1226, and a storage 1228. While a pager 1210 is a relatively simple device that does not require complex computation, the processing unit 1224 and the memory 1226 include a processing unit 1224 that processes and manages data for the pager 1210, using the memory 1226 to support its operation. The pager 1210 also includes a storage 1228. For example, storage 1228 may correspond to storage 160. In particular, storage 1228 may store a look-up table that associates codes or pager IDs with location information. For example, the look-up table may include a series of codes for pager locations, and each code may be associated with a location. That is, the pager 1210 may receive a code for a source of a resource, and the look-up table of storage 1228 maps that code to a street address.

FIG. 12 also shows a central server 1230 in communication with pager 1210. The central server 1230 may correspond to the server 640 as shown in FIGS. 6-7 and 10. Generally, pager 1210 is one of a network of pagers in communication with pager 1210. The central server 1230 includes a paging manager 1232. The paging manager 1232 includes a page transmitter 1234 and a page receiver 1236. These elements correspond to related elements of each pager 1210. For example, the page transmitter 1234 sends pages to each pager 1210 in the network, where the central server 1230 is the dialing party and the pager 1210 is the dialed party. For the page receiver 1236, the central server 1230 receives pages from each pager 1210 in the network. Here, each pager 1210 is the dialing party and the central server 1230 is the dialed party. As discussed further above, the central server 1230 receives pages 1260 from the pager 1210, and sends pages 1270 to the pager.

The central server 1230 also includes a resource table 1238. Such a resource table 1238 stores information about resource availability and locations of resources. FIG. 9 is an example of resource table 1238, but FIG. 9 is only an example, and resource table 1238 may include information in addition to or instead of that shown in example resource table 1238. Additionally, resource table 1238 may consist of multiple sub-tables. While FIG. 12 shows resource table 1238 as being a separate element, resource table 1238 is alternatively stored in storage 1248, which maintains resource table 1238 in a data storage device, a database such as a relational database, or another local or cloud-based form of data storage. The central server 1230 also includes a resource information encoder/decoder 1240. The resource information encoder/decoder 1240 is related to resource information encoder/decoder 1220, but operates to decode pages sent by the pager 1210 and to encode pages to be sent to the pager 1210. The central server 1230 also includes a resource information provider 1242. The resource information provider 1242 considers information in the resource table 1238 and generates a list of providers of resources for pagers associated with user 210 who needs those resources. The central server 1230 also includes a processing unit 1244, a memory 1246, and a storage 1248. These the processing unit 1244, the memory 1246, and the storage 1248 support the functioning of the central server 1230.

Figure 13:
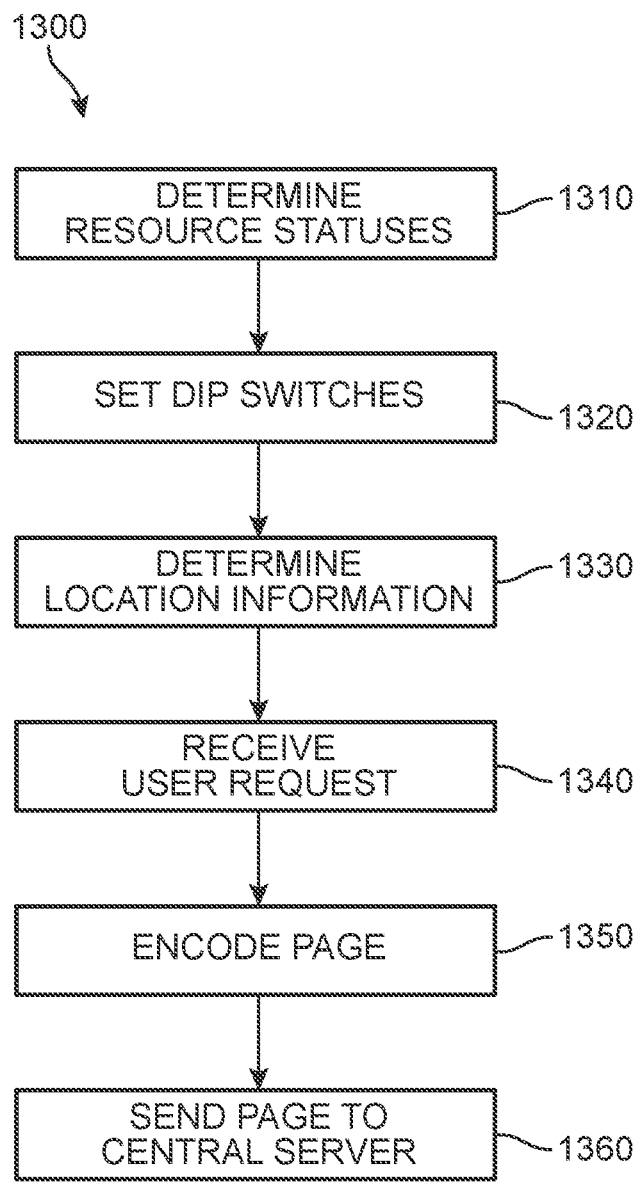
FIG. 13 is a flowchart of producing a page corresponding to the settings on a user pager and sending the page to a central server, according to an embodiment.

FIG. 13 is a flowchart of a method 1300 of producing a page corresponding to the settings on a pager 110 and sending the page to a central server 1230, according to an embodiment. In a first step 1310, the method 1300 determines resource statuses. For example, a user 210 determines whether he or she has or needs various resources, such as food, water, shelter, and electrical power. Such a resource determination may occur after or during a natural or man-made emergency, such as but not limited to a weather emergency (hurricane, tornado, blizzard, thunderstorm, hailstorm, tsunami, etc.), an earthquake, a wildfire, a terrorist action, etc.

In a second step 1320, the method 1300 includes setting dual in-line package (DIP) switches at the pager 110. Such DIP switches, as discussed above, may be set to represent a user's status with respect to resources. However, switches are not limited to DIP switches, and differing types of DIP switches are possibly used in different embodiments. For example, while illustrated embodiments show the use of tri-state DIP switches, other embodiments readily use rotary DIP switches.

In a third step 1330, the method 1300 includes determining location information. The pager 110 is associated with a phone number as a dialing party, as discussed above. The central server 1230 is a dialed party, receiving the page from the pager 110. Thus, the pager 110 associates its phone number or another form of identification with the page so that the central server 1230 is subsequently able to associate a location with the pager 110 that produced the page. In a fourth step 1340, the method 1300 includes receiving a user request. Such a user request involves pushing a control button at the pager 110. The user request indicates that the user 210 wishes to send a page to the central server 1230 representing his or her own resource status and receive at least one page representing how to obtain needed resources.

In a fifth step 1350, the method 1300 includes encoding a page. For example, the method produces a page by pager 110 as shown in FIG. 4, in which the page includes a header and a footer, as well as a payload where each digit indicates resource availability. However, other encoding schemes are also possible. For example, the encoding may use a template to encode the resource information in a recognized format. In a sixth step 1360, the method 1300 includes sending the page to a central server 1230. In such a step, the pager 110 is the dialing party and the central server 1230 is a dialed party.

Figure 14:
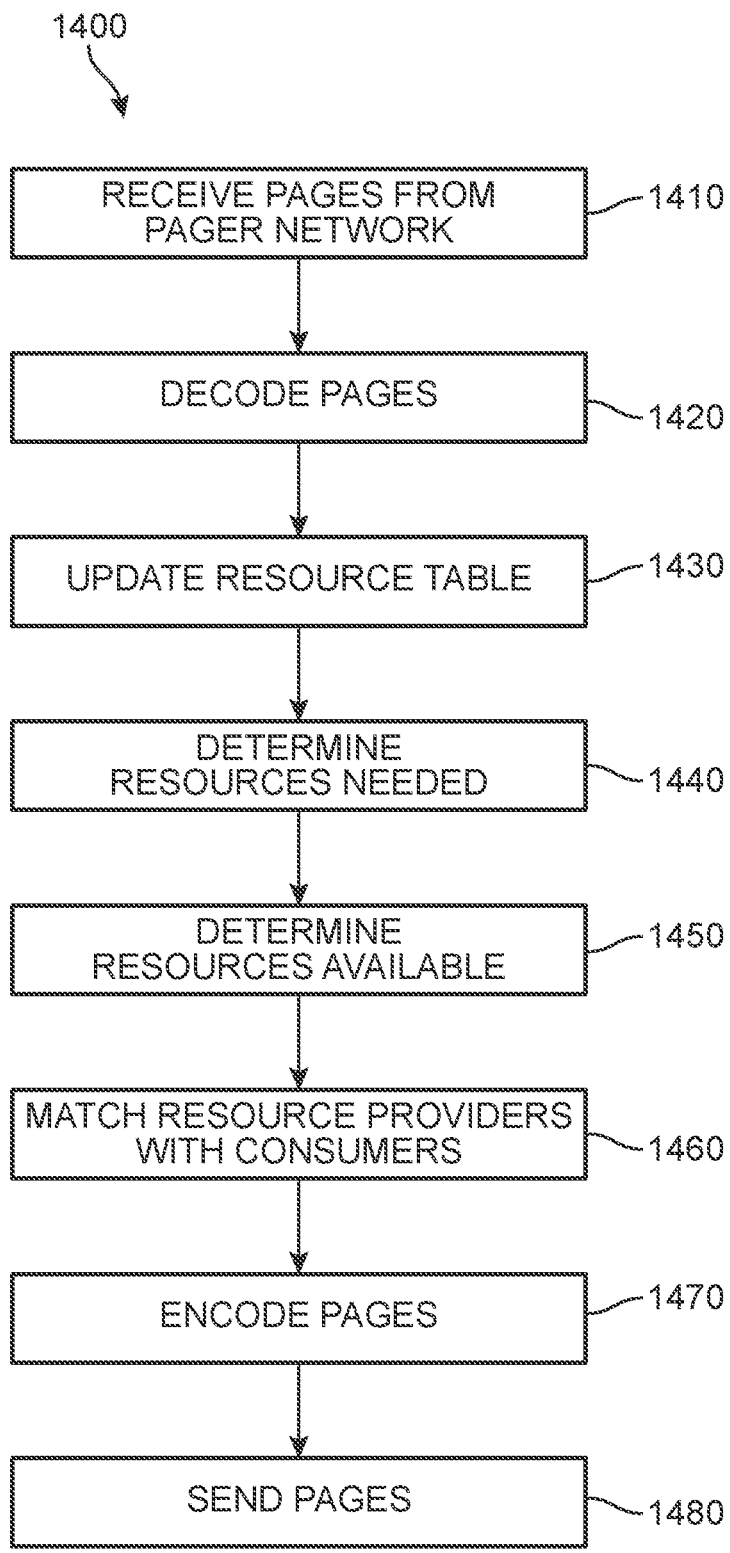
FIG. 14 is a flowchart of producing pages at a central server based on pages received from a pager network, according to an embodiment.

FIG. 14 is a flowchart of a method 1400 of producing pages at a central server 1230 based on pages received from a pager network, according to an embodiment. In a first step 1410, the method 1400 includes receiving pages from a pager network. For example, FIGS. 6-7 illustrate such a pager network. For example, these pages are sent from a plurality of pagers in a pager network, in accordance with FIG. 13. Such pages represent resource availability statuses at the respective pagers. At this step, the central server 1230 is the dialed party and the pagers are the dialing parties. In a second step 1420, the method 1400 includes decoding the received pages. The received pages may be similar to the example of FIG. 4 and may be decoded based on a predefined template or format.

In a third step 1430, the method 1400 includes updating a resource table 900. For example, the resource table 900 may correspond to the example of FIG. 9, and may include information about resource availability as well as locations associated with the pagers. However, it is also possible to store the locations separately in a location table that allows the central server 1230 to associate pagers with locations. In a fourth step 1440, the method 1400 includes determining which resources are needed by which pagers. Determining which resources are needed may be accomplished by scanning each column of the resource table 900 for an indicating that the resource is needed. For example, in the example of FIG. 9, the method could scan column 912 and determine that Pager 3 and Pager 4 each need food. In a fifth step 1450, the method 1400 includes determining which resources are available at which pagers. A similar scan of a column of the resource table 900 indicates that in column 912 food is available from Pager 1. While these steps refer to scanning columns, the resource table 900 could also be constructed to switch columns and rows.

In a sixth step 1460, the method 1400 includes matching resource providers with consumers that require those resources. This occurs on a resource by resource basis. For example, to perform the matching, the method 1400 derives a list of pagers that are able to share a resource, and match that list to each pager in a list of pagers that require that resource. In a seventh step 1470, the method 1400 includes encoding pages. To encode pages, the method, for each resource, transforms the pagers associated with resource providers into codes identifying those providers, separated by separation codes, and including a header and a footer, as shown in FIG. 5.

In an eighth step 1480, the method 1400 includes sending the encoded pages throughout the pager network. Here, the central server 1230 is the dialing party and the respective pagers are the dialed parties. The sending can operate in at least two ways. In one way, the central server 1230 sends all pages to all pagers, and the pagers check for codes attached to the pages indicating that the pagers pertain to them. In another way, the central server 1230 sends pages only to specific pagers.

Figure 15:
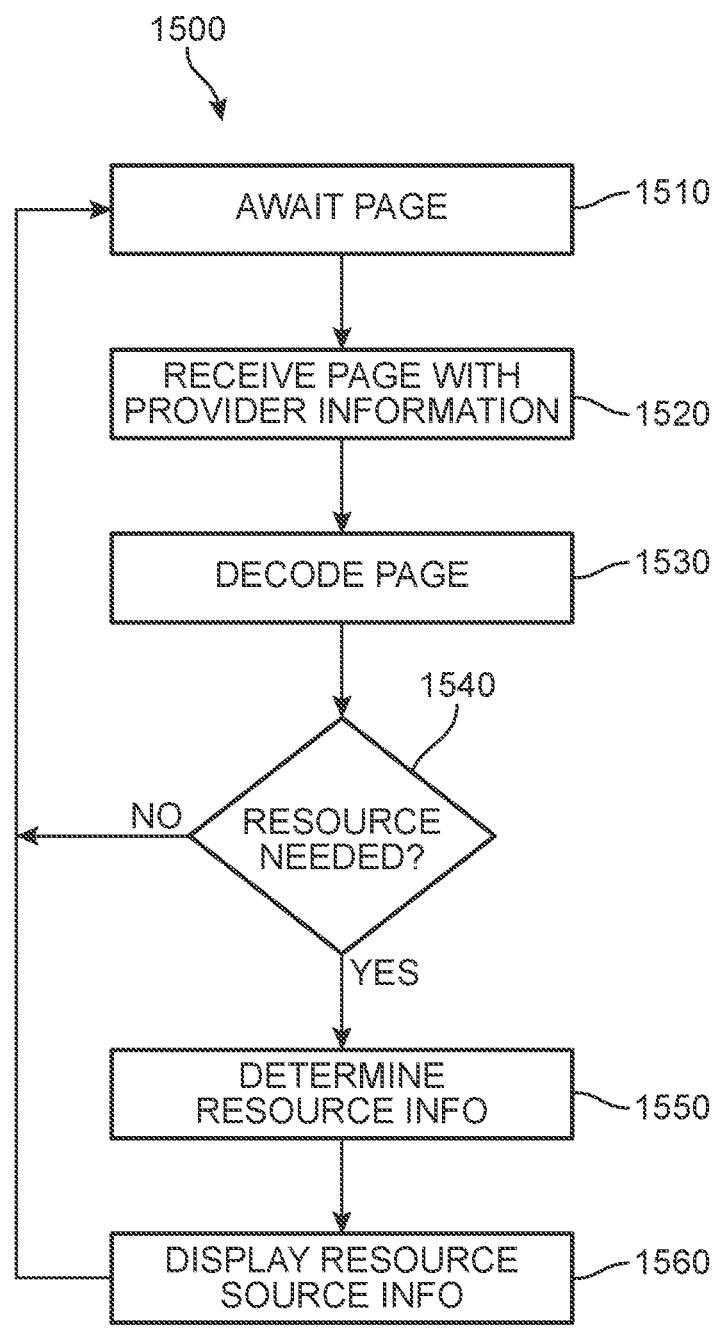
FIG. 15 is a flowchart of receiving pages at a user pager from a central server to establish availability of resources for that user, according to an embodiment.

FIG. 15 is a flowchart of a method 1500 of receiving pages at a user pager 110 from a central server 1230 to establish availability of resources for that user, according to an embodiment. In a first step 1510, the method 1500 includes awaiting a page. Here, the pager 110 is able to receive pages, and may be in a sleep state as it awaits a page from central server including information about resource availability. In a second step 1520, the method 1500 includes receiving a page with provider information at pager 110. Such a page may be similar to the page of FIG. 5.

In a third step 1530, the method 1500 includes decoding the page. Here, the method 1500 parses out codes of possible providers and determines which resource the page pertains to. In a fourth step 1540, the method 1500 includes determining if the resource is needed. For example, the pager 110 has determined that the page applies to water. If the resource (in this case water) is not needed, the method 1500 returns to step 1510 to await a page for needed resource. If the resource is needed, the method 1500 continues to fifth step 1550. In a fifth step 1550, the method 1500 includes determining resource information from the decoded page. Fifth step 1550 uses the identified resource sources, and uses a look-up table stored in storage 160 of pager 110 to ascertain corresponding locations. In a sixth step 1560, the method 1500 includes displaying resource source information for the user. For example, sixth step 1560 causes the pager 110 to display an address (or other location information, such as coordinates or directions) of at least one resource source. The user 210 may be able to navigate between multiple resources, and the pager may provide the resource sources in a certain manner, such as by listing closest sources first, or sources first with free supplies of a given resource.

Figure 16:
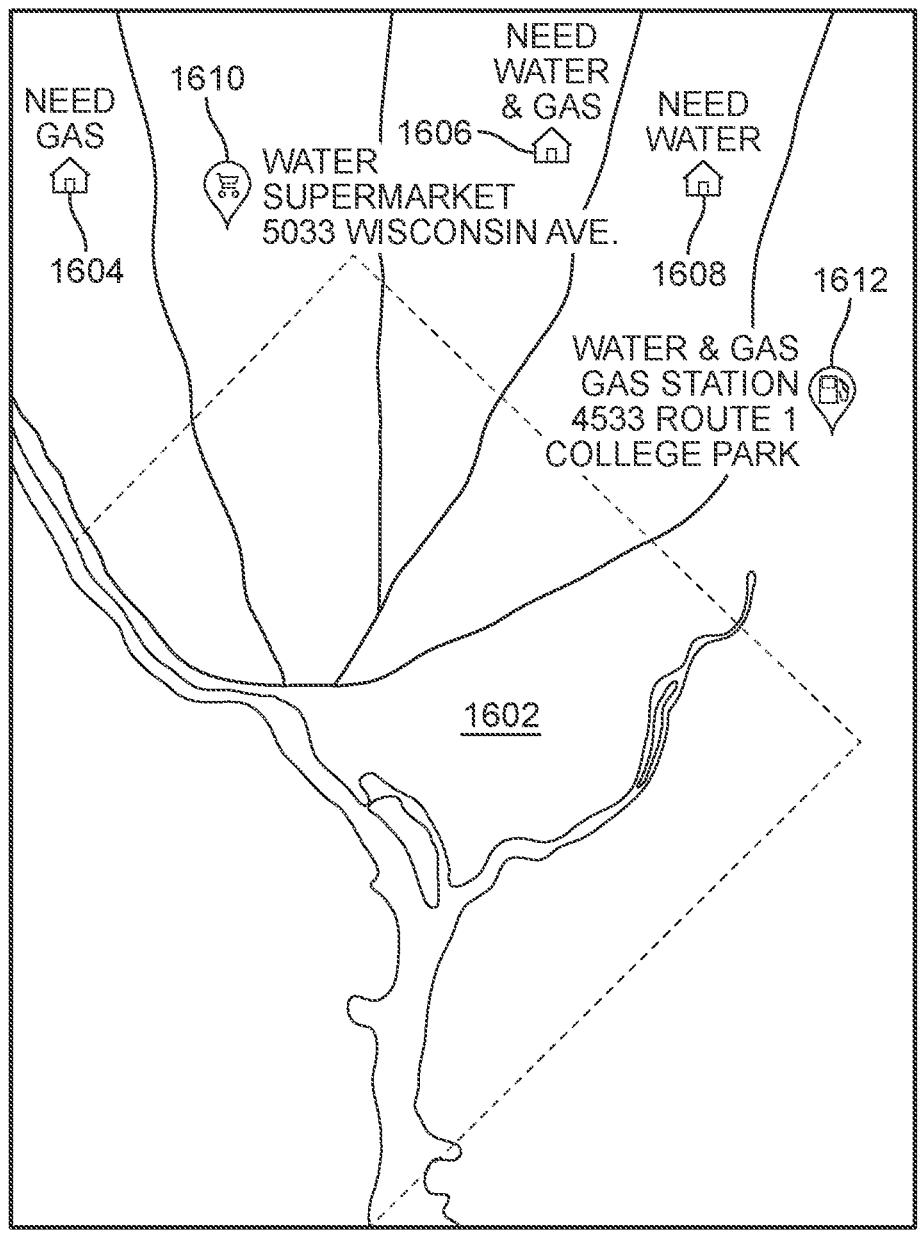
FIG. 16 is a map of an area illustrating properties associated with pagers that have resource requirements and properties that provide those resources, according to an embodiment.

FIG. 16 is a map of an area 1602 illustrating properties associated with pagers that have resource requirements and properties that provide those resources, according to an embodiment. For example, FIG. 16 is a rough approximation of features of the Washington, DC Metro area, but FIG. 16 is only an example and the embodiments may be used in an any geographic area. For example, FIG. 16 shows three homes 1604, 1606, and 1608. The user of a pager at home 1604 needs gas, the user of a pager at home 1606 needs gas, and the user of a pager at home 1608 needs water. Supermarket 1610 has water, and is associated with the address "5033 Wisconsin Ave." Gas station 1612 has water and gas, and is associated with the address "4533 Route 1, College Park."

The respective pagers 1604, 1606, and 1608 would be matched with resource providers by the central server. For example, the pager associated with home 1604 would show the address of gas station 1612, since that is the only available source of gas. The pager associated with home 1606 would show the address of supermarket 1610 for the water and the address of gas station 1612 for the gas, since supermarket 1610 is closer but only the gas station 1612 has gas. The pager associated with home 1608 would show the address of gas station 1612 because that is the closest source of water. However, even though home 1606 and home 1608 show a closest source of water, the user may also navigate to access the other source of water. As discussed above, the pagers that need resources may receive codes from the central server and use a local look-up table to determine addresses associated with the locations that can provide those resources.

FIG. 16 is only an example, and other examples may include other features, such as looking for free sources of a resource or providing directions to a source of a resource. Additionally, the map is not limited to users and homes. For example, individual users, governmental entities, non-profits and religious entities, and so on, may all be participants. Additionally, it is possible for an entity to have excess of one resource while lacking another. Further, even if an entity has enough of a resource, it may decide not to share that resource, or only to share with certain limitations. For example, private individuals may not desire to share their stockpile of water with arbitrary individuals, or a homeless shelter may not wish to provide shelter to a party that has the financial resources to go to a hotel.

The embodiments offer a variety of advantages. For example, by using switches such as dual in-line package (DIP) switches, a user may easily and efficiently provide a representation of the resources they have, lack, and supply. A pager network is robust and resilient, even after or during a disaster or other emergency, so the pager network may endure and operate even if other communications networks are no longer operational. Thus, each pager acts as a dialing party that sends a page to a central server, which is a dialed party that receives, aggregates, and processes information about resource availability. The central server then sends information about resource availability derived for the pagers through the network. The pagers receive this information and can use the information in conjunction with an internal look-up table to inform users how to effectively find the resources they need. The information may also be customized for users of pagers to organize the providers, such as based on proximity or monetary costs of resources.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to, servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A pager to provide access for a user of the pager to resources after an emergency, comprising:
switches on the pager set to represent availability of resources for the user of the pager;
at least one processor configured to:
read the settings of the switches on the pager set to represent the availability of resources for the user of the pager;
convert the settings of the switches to a first coded numeric representation;
send the first coded numeric representation to a central server as a page;
receive a second coded numeric representation from the central server as a page;
decode the second coded numeric representation to identify at least one source of a resource to be used by the user of the pager; and
provide information about at least one location of the at least one source of the resource to the user of the pager using a display of the pager.

2. The pager of claim 1, wherein each of the switches is a tri-state switch whose position indicates for a respective resource that the user has enough of the resource, excess of the resource, or lacks the resource.

3. The pager of claim 1, wherein the pager provides to the user a location of a closest source of the resource.

4. The pager of claim 1, wherein the pager provides to the user a location of a source of the resource as a street address.

5. The pager of claim 1, wherein the pager provides to the user a location of a source of the resource at which the resource is available free of charge.

6. The pager of claim 1, wherein the pager generates and sends an updated first coded numeric representation based on altered settings of the switches after resource availability changes.

7. The pager of claim 1, wherein the pager further comprises a look-up table used to associate identifiers of locations with corresponding location information.

8. A method to provide access for a user of a pager to resources after an emergency, comprising:
generating a first coded numeric representation based on settings of switches on the pager set to represent availability of resources for the user of the pager, wherein each switch is a tri-state switch whose position indicates for a respective resource that the user has enough of the resource, excess of the resource, or lacks the resource;

sending a page comprising the first coded numeric representation to a central server;

receiving a second coded numeric representation from the central server as a page;

decoding the second coded numeric representation to identify at least one source of a resource to be used by the user of the pager;

storing information about the at least one source of the resource at the pager;

determining a source of the resource from the information; and providing location information about the source of the resource to the user of the pager using a display of the pager.

9. The method of claim 8, wherein the determining determines a closest source of the resource.

10. The method of claim 9, wherein the closest source is a business that sells the resource.

11. The method of claim 9, wherein the location information is a street address of the closest source.

12. The method of claim 11, wherein the street address is obtained by using a pager ID and finding associated location information using a look-up table.

13. The method of claim 8, further comprising generating and sending an updated first coded numeric representation based on altered settings of the switches after resource availability changes.

14. The method of claim 8, further comprising allowing the user to navigate between different sources of the resource if the user of the pager requires multiple resources that cannot all be obtained from the same source.

15. A method performed by a central server to provide access to resources for users of pagers in a pager network after an emergency, comprising:

receiving a plurality of pages from pagers in a pager network;

decoding the plurality of pages to determine which pagers require resources and which pagers have excess quantities of resources;

determining, for each pager in the pager network, which resources each pager requires;

determining, for each resource, at least one pager able to provide that resource;

gathering, for each resource required by each pager in the pager network, a set of pagers able to provide that resource;

generating a page representing resource availability and location information for the set of pagers as a coded numeric representation; and sending the page to the pagers in the pager network.

16. The method of claim 15, further comprising storing results of decoding the plurality of pages in a resource table.

17. The method of claim 16, wherein the resource table stores availability information for each resource for each pager, based on the plurality of pages.

18. The method of claim 17, wherein the resource table further stores information about locations of the plurality of pagers.

19. The method of claim 17, further comprising using the resource table for determining which resources each pager requires and determining at least one pager able to provide the resources.

20. The method of claim 15, further comprising sorting the set of pagers by distance from a receiving pager in the generated page.

* * * * *